(12) United States Patent  (10) Patent No.: US 8,177,252 B2
Tambornino  (45) Date of Patent: May 15, 2012

(54) FIFTH WHEEL FOLDING HITCH

(75) Inventor: Curt Tambornino, Altoona, WI (US)

(73) Assignee: Curt Manufacturing, LLC, Eau Claire, WI (US)

( * ) Notice: Subject to any disclaimer, the term of this patent is extended or adjusted under 35 U.S.C. 154(b) by 0 days.

(21) Appl. No.: 12/904,479

(22) Filed: Oct. 14, 2010

(65) Prior Publication Data
US 2012/0091690 A1   Apr. 19, 2012

(51) Int. Cl.
  *B60D 1/54* (2006.01)
(52) U.S. Cl. .................. 280/491.1; 280/490.1
(58) Field of Classification Search ............ 280/491.3, 280/490.1, 491.1
  See application file for complete search history.

(56) References Cited

U.S. PATENT DOCUMENTS

| | | | |
|---|---|---|---|
| 3,893,713 A | 7/1975 | Ivy | |
| 4,256,324 A * | 3/1981 | Hamilton | 280/433 |
| 4,540,194 A | 9/1985 | Dane | |
| 4,546,994 A | 10/1985 | Taylor | |
| 4,570,966 A | 2/1986 | Giboney et al. | |
| 4,657,274 A | 4/1987 | Mann et al. | |
| 4,921,266 A | 5/1990 | Beals | |
| 5,016,898 A | 5/1991 | Works et al. | |
| 5,435,585 A * | 7/1995 | Chambers | 280/415.1 |
| 5,755,452 A * | 5/1998 | Tambornino | 280/415.1 |
| 5,788,258 A * | 8/1998 | Gill et al. | 280/491.1 |
| D401,542 S | 11/1998 | Lindenman | |
| 5,860,671 A | 1/1999 | Mackeown | |
| 5,893,575 A | 4/1999 | Larkin | |
| 5,906,387 A * | 5/1999 | Wallace | 280/491.3 |
| 5,971,418 A * | 10/1999 | Lindenman et al. | 280/491.1 |
| 6,095,545 A * | 8/2000 | Bol et al. | 280/491.1 |
| 6,199,890 B1 | 3/2001 | Lindenman et al. | |
| 6,409,202 B1 | 6/2002 | Putnam | |
| D472,188 S | 3/2003 | Tambornino | |
| 6,533,308 B1 | 3/2003 | Tambornino | |

* cited by examiner

*Primary Examiner* — Tashiana Adams
(74) *Attorney, Agent, or Firm* — Shewchuk IP Services, LLC; Jeffrey D. Shewchuk (57) ABSTRACT

A tube is cut to form a tube-formed box with an opening on its top side. A hitch ball is pivotally mounting on the tube-formed box, so as to extend above the tube-formed box when the hitch ball is in the operative position and to reside within the tube-formed box when the hitch ball is in the inoperative, stowed position. The tube-formed hitch box is joined to and extends through an underbed plate, with the top surface of the tube-formed hitch box higher than the top surface of the underbed plate, so the bed of the truck can ride on the underbed plate up to and even with the tube-formed hitch box. In another aspect, the door of the hitch includes one or more recesses around the finger hole, such as a finger access recess on one top side and a finger grip recess on the opposite bottom side of the door.

20 Claims, 8 Drawing Sheets

(PRIOR ART)

FIFTH WHEEL FOLDING HITCH

CROSS-REFERENCE TO RELATED APPLICATION(S)

Ornamental aspects of the present invention are described and claimed in U.S. patent app. Ser. Nos. 29/376,935 and 29/376,938, filed on even date herewith, incorporated herein by reference.

BACKGROUND OF THE INVENTION

The present invention relates generally to a ball hitch adapted to releasably engage a coupling mechanism on a trailer, and more particularly to a folding ball hitch adapted to be mounted in the bed of a pickup truck for releasably engaging a socket coupling of a fifth wheel trailer.

Ball hitches are used in a wide variety of towing applications for towing many different kinds of trailers. Ball hitches may be mounted to vehicle bumpers and/or hitch drawbars, and in some applications mounted in the bed of a pickup truck. A ball hitch which is mounted in the bed of a pickup truck typically releasably engages a coupling socket of a fifth wheel trailer. The ball hitch is usually located near the center of the truck bed directly over the rear axle, so that the weight of the trailer is evenly distributed between the sides of the truck. Because the ball hitch raises above the surface of the truck bed, use of the truck bed for other purposes, such as hauling various items, is impeded.

To overcome the inconvenience of a ball hitch protruding from the center of a pickup truck bed, folding ball hitches were developed which allow the ball to be lowered into an inoperative position below the surface of the truck bed, thus allowing the truck bed to be used for other purposes when not towing a trailer. A cover plate in the truck bed serves to cover the ball when it is in the inoperative position and also maintains the ball in its operative position when the ball hitch is in use. The cover plate prevents the ball from rotating from its operative position to its inoperative position, until the cover plate is moved out of the path of the ball. One such folding ball hitch is disclosed in U.S. Pat. No. 5,755,452, owned by the assignee of the present invention and incorporated herein by reference.

The hitch is typically mounted with the cover plate at an elevation even with or slightly above the bed of the pickup truck. For instance, the folding ball hitch of U.S. Pat. No. 5,755,452 includes a mounting plate which is mounted on top or even with the bed of the pickup truck. The rest of the hitch structure is beneath the bed of the pickup truck. For additional support strength, the underbed portion of the hitch may mount to the frame of the towing vehicle. For instance, underbed rails (disclosed for instance in U.S. Pat. No. 6,533,308, owned by the assignee of the present invention and incorporated herein by reference) may extend laterally underneath the truck bed, supporting the mounting plate from the frame of the towing vehicle. In the inoperative, stowed position, the hitch ball can be retained in an enclosure, with the enclosure being formed by welding side frame plates and a bottom frame plate together and to the mounting plate.

Such ball hitches need to be strong and reliable, while maintaining a relatively low cost. Improvements which increase the strength and/or reliability of the ball hitch, while simultaneously reducing costs such as in manufacturing and assembly, are very beneficial.

BRIEF SUMMARY OF THE INVENTION

The present invention is a method of forming a folding hitch and a folding hitch formed thereby that steps away from the plate mindset of the prior art, and rather involves cutting a tube to form a tube-formed box with an opening on its top side. The hitch ball is pivotally mounting on the tube-formed box. The hitch ball extends above the tube-formed box when the hitch ball is in the operative position, and resides within the tube-formed box when the hitch ball is in the inoperative, stowed position. With the tube-formed hitch box, welding operations of the prior art are avoided, and the hitch box is stronger and looks better than the prior art. In another aspect, the door of the hitch includes one or more recesses around the finger hole, such as a finger access recess on one top side and a finger grip recess on the opposite bottom side of the door.

While the above-identified drawing figures set forth a preferred embodiment, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION

Figure 1:
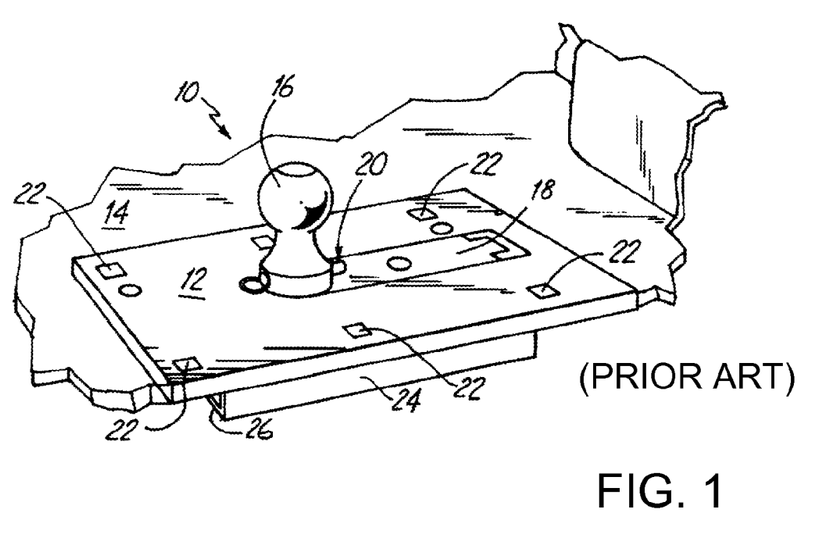
FIG. 1 is a perspective view from above showing the prior art hitch of U.S. Pat. No. 5,755,452.

As shown in FIG. 1, a folding ball hitch 10 of the prior art includes a mounting plate 12 which is adapted to be mounted in the bed 14 of a pickup truck or similar vehicle. The folding ball hitch 10 includes a ball 16 which is adapted to releasably engage a coupling mechanism of a trailer (not shown), a door or cover plate 18, and a safety latch 20 securing the ball 16 in an operative position.

Figure 5:
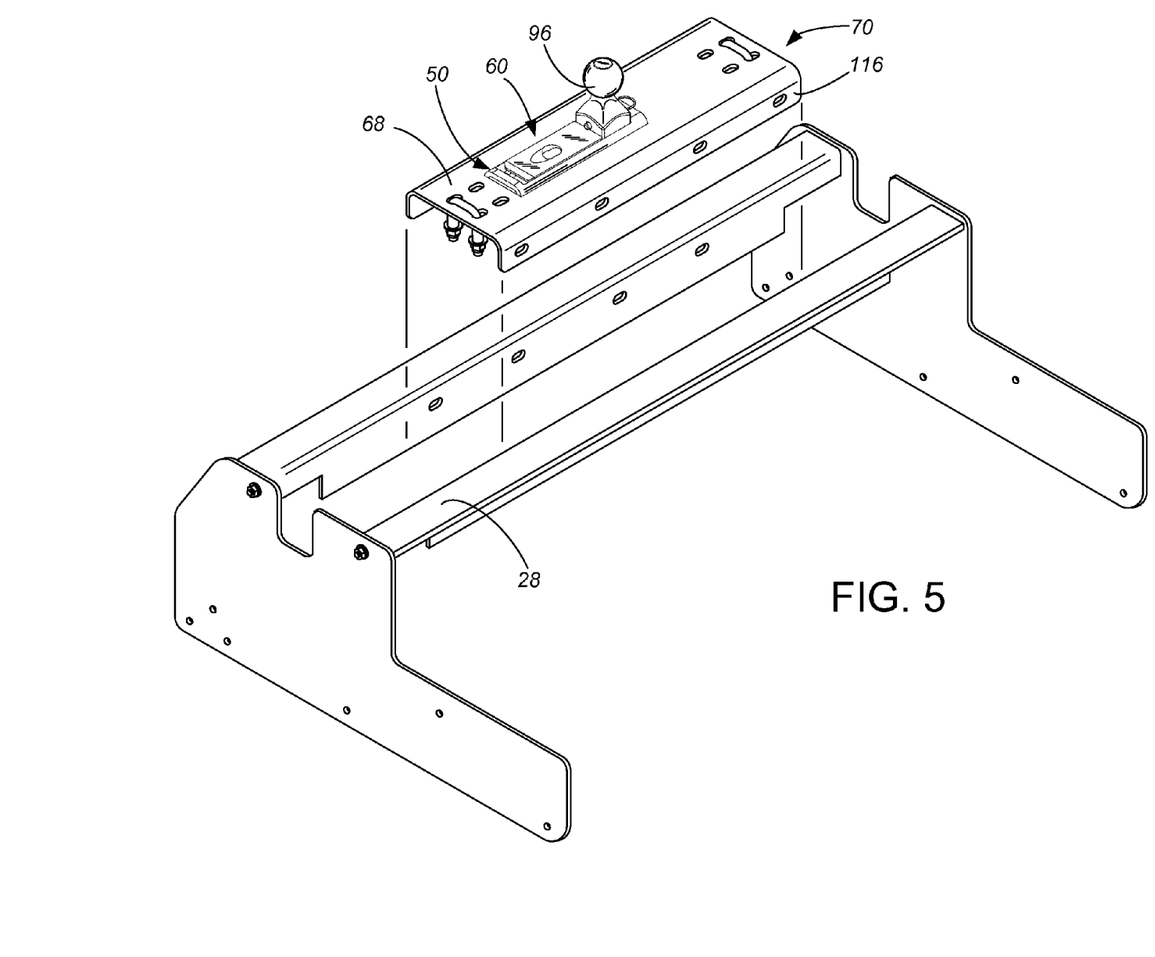
FIG. 5 is a perspective view showing the folding hitch of the present invention relative to the underbed rail structure.
Figure 6:
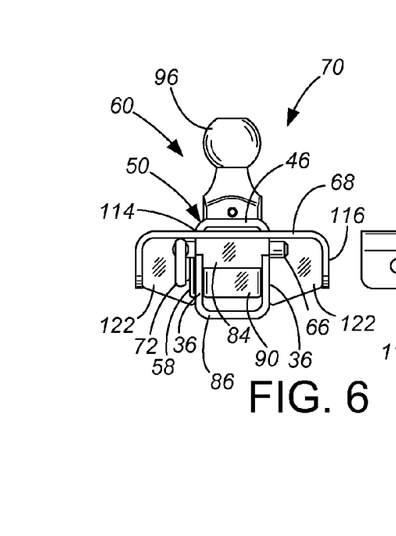
FIG. 6 is a left side elevational view of the hitch of FIGS. 4 and 5.
Figure 7:
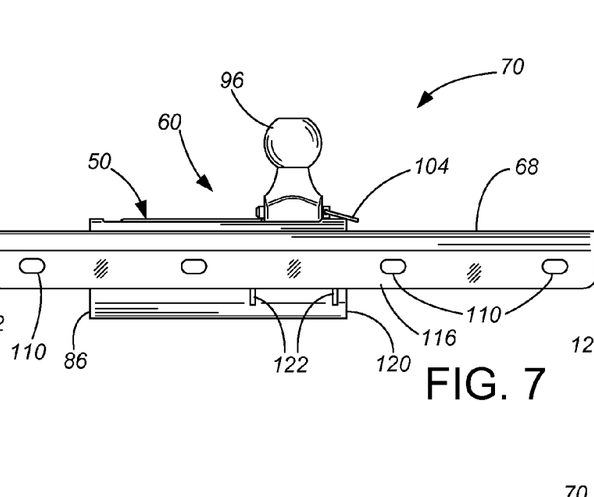
FIG. 7 is a rear view of the hitch of FIGS. 4-6. The front elevational view is a mirror image of FIG. 7.
Figure 8:
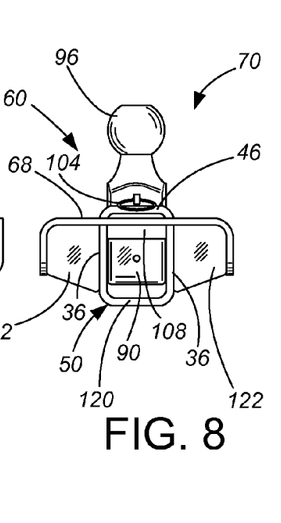
FIG. 8 is a right side elevational view of the hitch of FIGS. 4-7.
Figure 9:
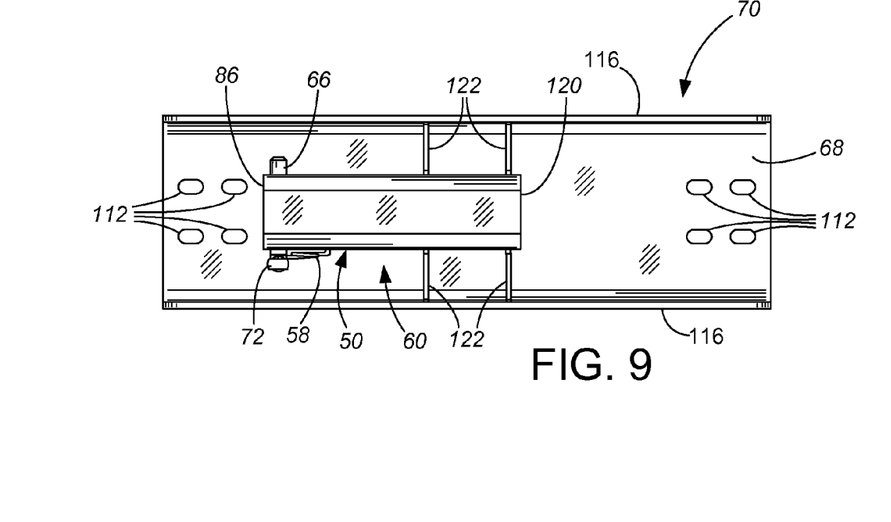
FIG. 9 is a bottom plan view of the hitch of FIGS. 4-8.
Figure 10:
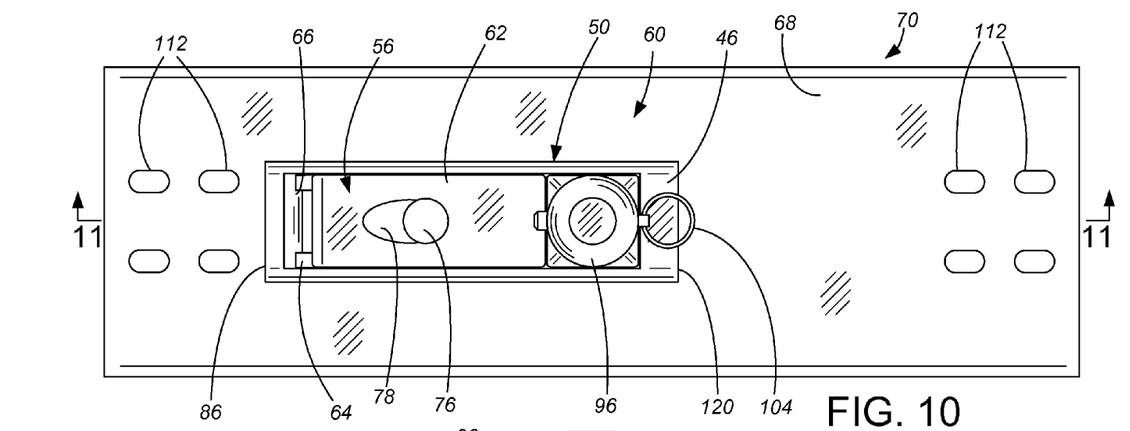
FIG. 10 is a top plan view of the hitch of FIGS. 4-9.

The folding ball hitch 10 is secured in the bed 14 by bolts 22 which pass through mounting plate 12 and into the truck bed 14 or into the underbed support structure 28 (shown in FIG. 5). In the prior art folding ball hitch 10, side frame plates 24 and bottom frame plate 26 are secured to the bottom of the mounting plate 12, such as by welding or other means known in the art. The side frame plates 24 and bottom frame plate 26, together with mounting plate 12, provide the structural framework of folding ball hitch 10.

Figure 11:
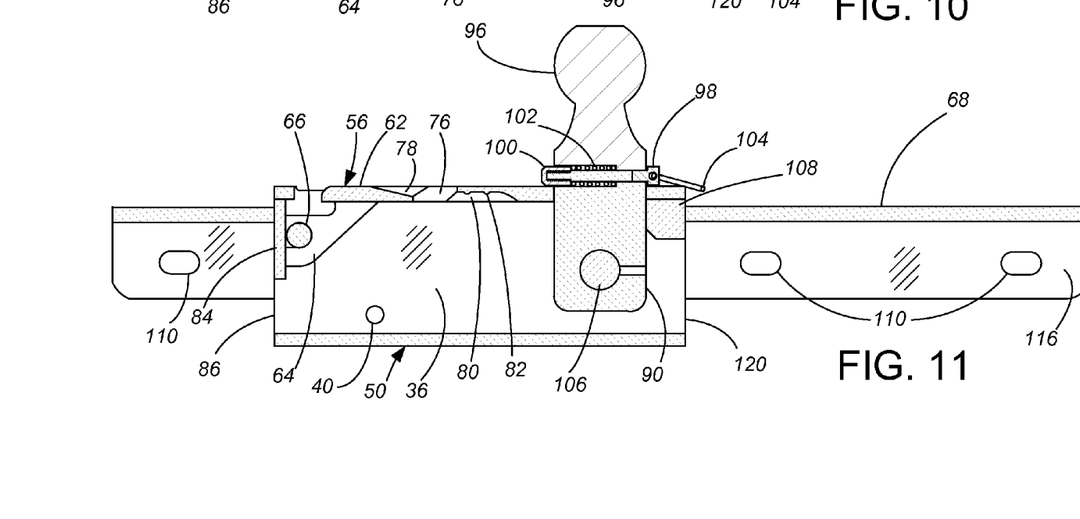
FIG. 11 is a cross-sectional view taken along lines 11-11 in FIG. 10.
Figure 12:
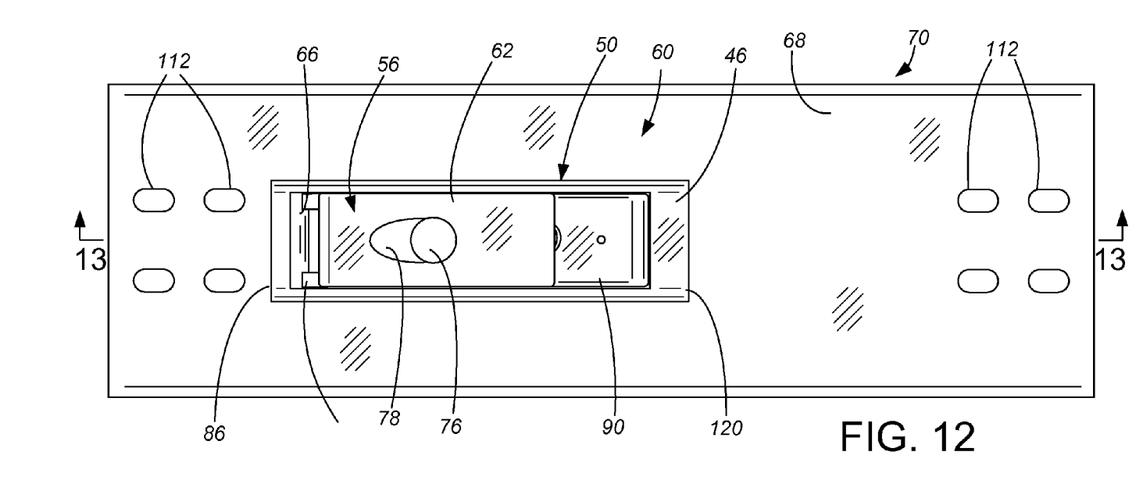
FIG. 12 is a top plan view of the hitch of FIGS. 4-10 shown in the folded, inoperative position.
Figure 13:
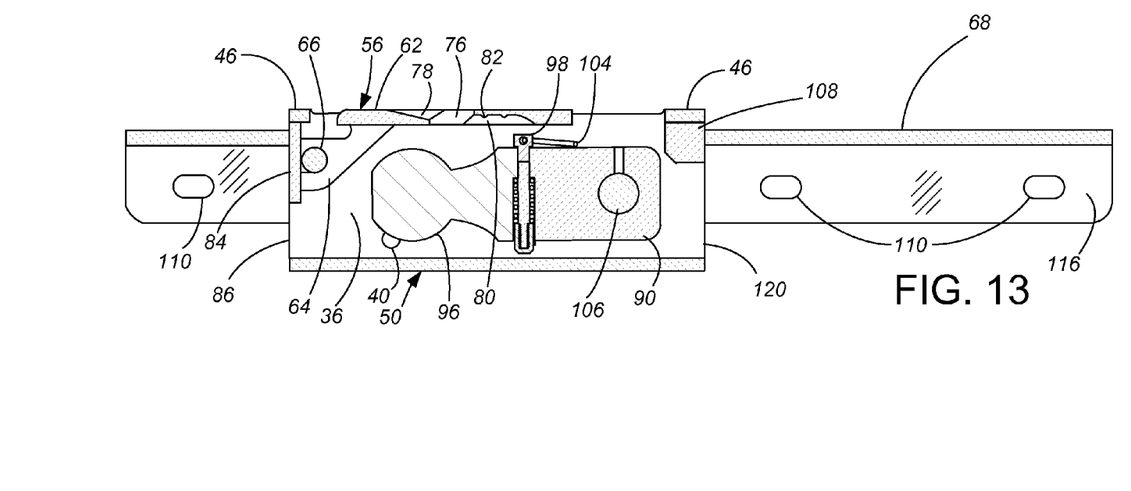
FIG. 13 is a cross-sectional view taken along lines 13-13 in FIG. 12.

Manufacture of the folding ball hitch 10 most commonly involves cutting or stamping the mounting plate 12, the side frame plates 24 and the bottom frame plate 26 from plate steel, such as at a thickness of about ¼ inch. The bolt hole openings for the bolts 22 are cut or machined through the mounting plate 12. Holes are cut or machined through the side frame plates 24 for the ball pivot pin 106 (shown in FIGS. 3, 11 and 13). Additional holes may be cut or machined through the side frame plates or bottom frame plate 26 such as for holding a spring (not shown) for spring assist operation of either the cover plate 18 or the ball 16. After the plate shapes of the mounting plate 12, the side frame plates 24 and the bottom frame plate 26 are formed, the straight edges are welded or otherwise attached in the desired locations to the appropriate flat surfaces, forming a box-like structure. Fixtures (not shown) may be used so the mounting plate 12, the side frame plates 24 and the bottom frame plate 26 are held in the desired locations relative to each other during the welding/joining operation.

When the welding is completed, finishing and coating operations (such as powder-coating) may be required to improve the appearance of the welded joints of the prior art hitch 10. Even with the finishing and coating operations, the welded joints generally have a less pleasing, rougher appearance than the planar plate surfaces. The welded joints also form a likely location for corrosion and rust, as well as inherently weak locations where the various plates 12, 24, 26 may become separated from each other after years or decades of use and abuse.

Figure 2:
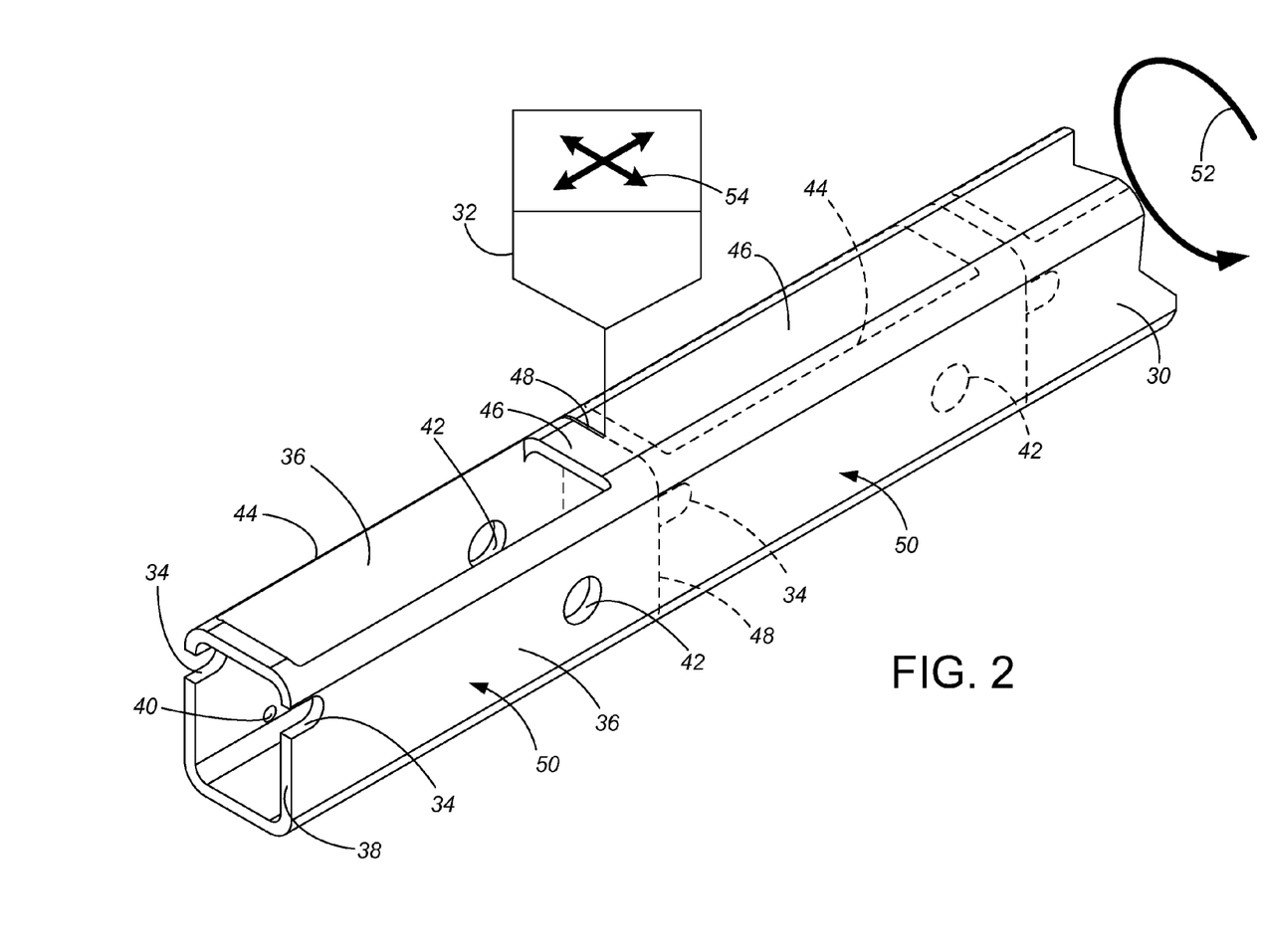
FIG. 2 is a perspective view showing a tube laser cutting a tube to form the preferred tube-formed box used in the present invention.

In contrast to the use of plate material of the prior art, the starting point for the present invention is tube material 30 best shown in FIG. 2. For instance, the preferred tube material is a tube 30 which is 3 inches wide and 4 inches tall, with a wall thickness of about 0.31 inches, formed out of A-500 Grade B hot rolled steel. This tube material 30 is commercially available such as in lengths of about 20 or 24 feet.

The steel tube material 30 is then cut with a tube laser 32 (shown schematically). Specifically, six openings are cut into the tube material 30 to form the preferred embodiment: two door pivot pin openings 34 (approx. ⅔ in. diameter) relatively high in each side wall 36 contiguous with the tube end 38, one spring securing opening 40 (circular, approx. ⅜ in. diameter) relatively low in one side wall 36 about 2½ inches from the tube end 38, two ball pivot pin openings 42 (circular approx. 1 in. diameter) roughly centered in the height of each side wall 36 about 8 inches from the tube end 38, and a large, rectangular opening 44 through essentially the entire 2⅜ inch interior width of the top wall 46, extending from about ½ inch from the tube end 38 to about 9⅓ inches from the tube end 38. After these six openings 34, 40, 42, 44 are cut into the tube walls 36, 46, the tube 30 is cut off with a 360° straight cut 48, perpendicular to the tube axis, at a length of about 10⅓ inches from the tube end 38, forming the tube formed box 50 which will support and house the ball 16.

By using a tube laser 32, the cutting process can be highly automated and performed quickly. In the automated process, the 360° straight cut 48 finishing the laser cutting of one tube box 50 also is the first cut starting the next tube box 50. All of the cuts are located by their distance away from the free end 38 of the tube 30 (i.e., relative to the last 360° straight cut 48), while the tube 30 is held in place and manipulated relative to the cutting laser 32 by the remaining length of the tube 30, as reflected by the arrows 52, 54.

Figure 3:
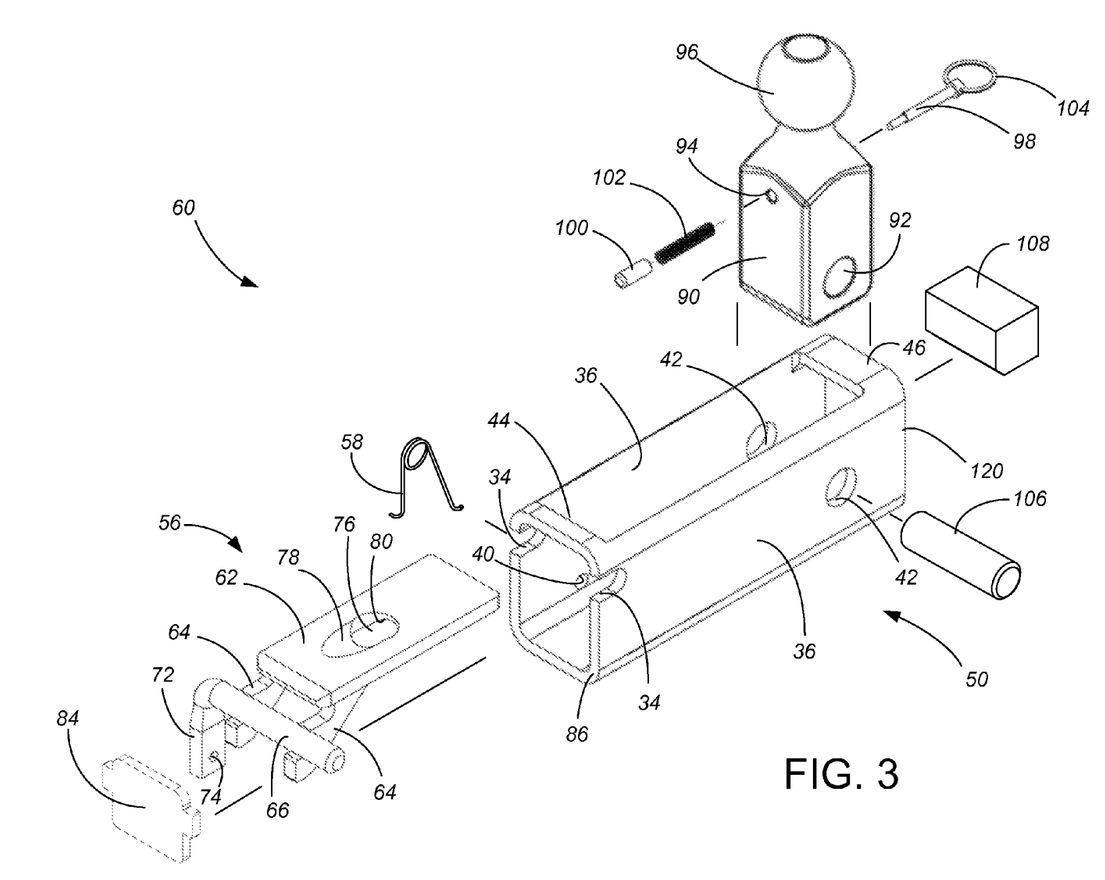
FIG. 3 is a perspective, assembly view of the folding hitch box of the present invention.

As shown in the assembly drawing of FIG. 3, the tube-formed box 50 is assembled with a door weldment 56, a door spring 58, and a folding ball 16 into a folding hitch box 60. The preferred door weldment 56 includes a door 62, two door supports 64 and a door pivot pin 66. The folding hitch box 60 is then joined with an underbed plate 68 shown in FIGS. 4-13. The underbed plate 68 can then be supported from the frame of the towing vehicle (not shown), such as through a two-rail underbed frame 28 as already known in the art.

The door 62 for the folding ball hitch 70 can be formed by machining plate steel, such as at a preferred thickness of about ⅜ in. If formed with plate steel, two downwardly extending door supports 64, each themselves formed from plate steel, can be used to rigidly attach the door 62 to the door pivot pin 66 in a door weldment 56. Alternatively the door 62 and door supports 64 could be jointly bent from a single piece of plate steel, or the entire door structure 56 could be formed as a single cast member. The door 62 has a length and width to match the length and width of the door opening 44 in the tube-formed box 50. The door pivot pin 66, at a preferred diameter of about ⅝ inches, includes a downwardly extending spring flange 72 with a spring receiving opening 74.

A finger hole 76, preferably circular with a diameter of about 1⅛ inches, is generally centered in the door 62. A finger access recess 78 on the top surface of the door 62 allows easier and more comfortable finger access to the finger hole 76. The preferred finger access recess 78 is on the pivot pin side of the finger hole 76. The finger access recess 78 preferably extends through at least half the thickness of the door 62, such as having a maximum depth of about ⅔ of the door plate thickness. The finger access recess 78 preferably has a smooth top surface without any sharp surfaces, for comfort of the user when using the finger hole 76 to open the door 62. A finger grip recess 80 (best shown in FIGS. 11 and 13) on the bottom surface of the door 62 allows easier finger pulling through the finger hole 76. The preferred finger grip recess 80 is on the side of the finger hole 76 away from the door pivot pin 66. A grip assist structure, such as two gripping bumps 82, is preferably positioned in the finger grip recess 80. The finger grip recess 80 preferably extends through at least half the thickness of the door 62, such as having a maximum depth of about ⅔ of the door plate thickness.

The door weldment 56 is assembled to the tube-formed box 50 by placement of the door pivot pin 66 into the door pivot pin openings 34. The door pivot pin 66 is then held in place with an end cap 84 joined on the end 86 of the tube-formed box 50, which still allows the door weldment 56 to pivot relative to the tube-formed box 50.

A spring 58 is connected between the spring receiving opening 74 on the spring flange 72 of the door weldment 56 and the spring securing opening 40 of the tube-formed box 50. Preferably the orientation of the spring 58 relative to the spring flange 72 causes the spring 58 to bias the door 62 in two directions, both in a closed direction when the door 62 is nearly closed and in an opened direction when the door 62 is nearly opened.

The hitch ball 16 and its associated plunger pin 20 are formed in accordance with prior art methods. The preferred ball 16 has a generally square base 90 of just less than 2⅜ inches, with a ball pivot pin bore 92 and a plunger pin bore 94 therethrough. The preferred ball 16 is formed of SAE 5140 alloy steel, providing a 2.3 in diameter ball 96, heat treated to a surface hardness of 30-35 RC, and finished with a polished mirror, chrome plated finish. The plunger pin 20 includes a pin screw 98 which, after its insertion into the plunger pin bore 94, threadably mates with a plunger tip 100 with a compression spring 102 riding on the pin screw 98 between the plunger tip 100 and an interior shoulder of the hitch ball 16 around the plunger pin bore 94. A size 5 key ring 104 is attached on the end of the plunger pin 20 for ease of pulling the plunger pin 20 when the ball 16 is moved from its operative to inoperative position.

The hitch ball 16 and its associated plunger pin 20 are lowered into the tube-formed box 50 from above, and pivotally connected to the tube-formed box 50 with a folding ball pivot pin 106. The preferred folding ball pivot pin 106 is quite large, such as a 1 inch diameter pivot pin, to withstand the towing forces which will be placed on it. A ball stop 108 is secured into the hitch ball end of the tube-formed box 50, with the folding ball 16 contacting the ball stop 108 in the open or operative position.

Figure 4:
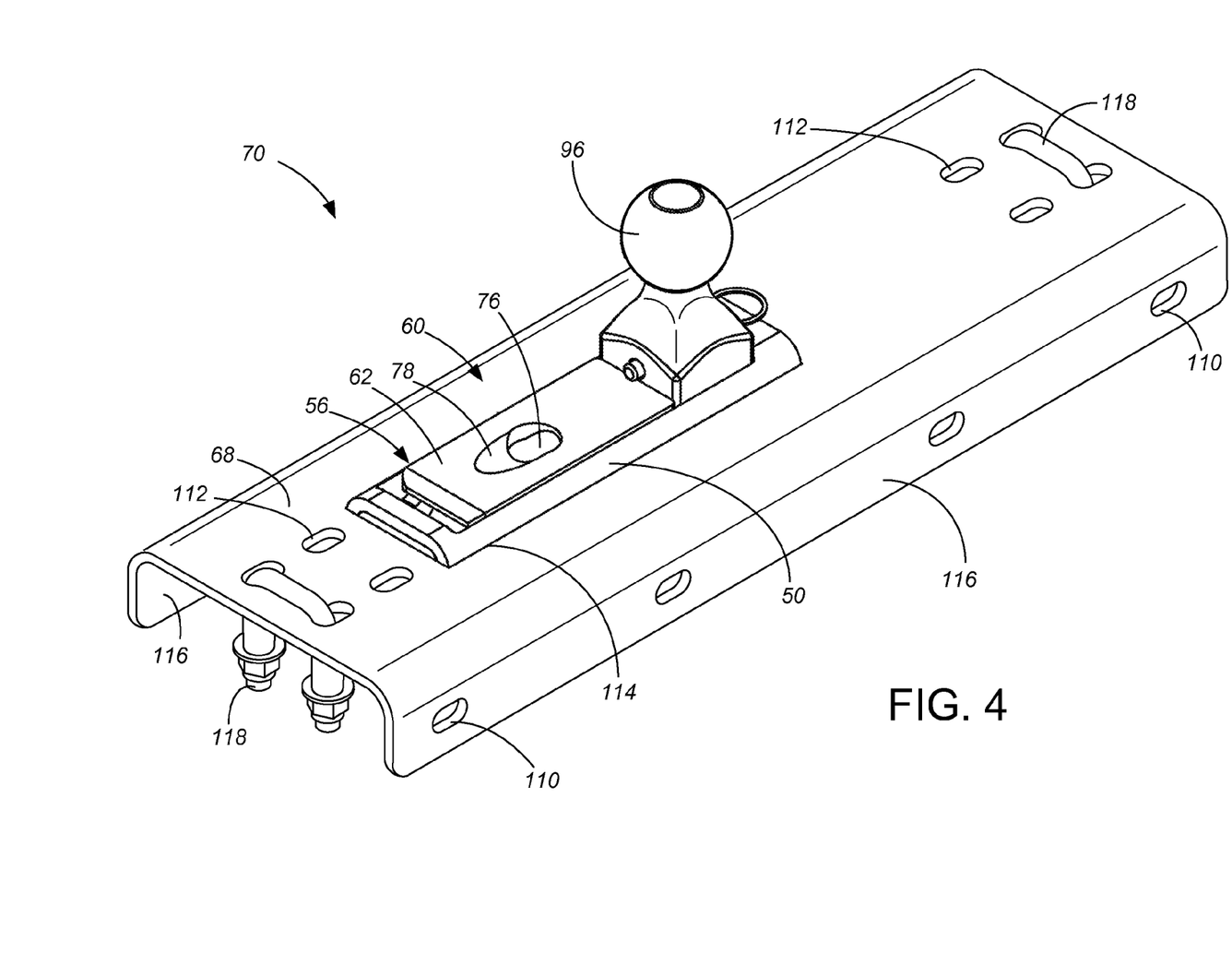
FIG. 4 is a perspective view of the folding hitch of the present invention.

The preferred underbed plate 68 is formed from ¼ inch thick plate steel (A-36 hot rolled steel), with eight rail bolt openings 110 running along the sides, chain bolt openings 112 along its center, and a rectangular box opening 114 sized to receive the tube-formed hitch box 60. After the bolt openings 110, 112 and the box opening 114 are formed in the underbed plate 68, the flanges 116 may be bent downward, such as at 90° relative to the plate plane and with a ½ inch radius, forming a underbed plate 68 which in the preferred embodiment is about 2¼ in. tall, 7¾ inches long and 24⅜ inches wide. Hitch chain bolts 118 may be attached into the chain bolt openings 112.

The tube-formed hitch box 60 is secured to the underbed plate 68, such as by welding or other means known in the art. While the assembly of the hitch ball 16 and/or the door weldment 56 into the tube-formed box 50 could be performed after the tube-formed box 50 is secured to the underbed plate 68, the preferred method allows for easier placement of the end cap 84 and ball stop 108 into the ends 86, 120 of the tube-formed box 50. The elevation of the tube-formed hitch box 60 relative to the underbed plate 68 is intended to match the thickness of the truck bed 14, that is, the upper surface of the tube-formed hitch box 60 is ideally at the same height as the top of the truck bed surface, with the underbed plate 68 contacting and supporting the bottom surface of the truck bed 14. In the preferred embodiment, the upper surface of the tube-formed box 50 and door 62 are about ½ inch higher than the upper surface of the underbed plate 68. The preferred end cap 84 and ball stop 108 fill the ends 86, 120 of the tube-formed box 50 above the underbed plate 68. In the embodiment shown, four gussets 122 (best shown in FIG. 9) are welded to the underside of the underbed plate 68 and the sides 36 of the tube-formed hitch box 60 to assist in supporting the tube-formed hitch box 60 relative to the underbed plate 68 and to provide strength to the flanges 116.

The folding ball hitch 70 with the tube-formed hitch box 60 of the present invention provides several advantages over the prior art. The tube formed hitch box 60 has no sharp outer corners and provides a pleasingly smooth ornamental appearance which is quite different from the plate-like appearance of the prior art. The tube formed box 50 is stronger and more robust than the prior welded joints between the bottom frame plate 26, the side frame plates 24, and the mounting plate 12. The manufacturing process for the folding ball hitch 70 avoids several fixturing and welding steps of the prior art, resulting in a less expensive manufacturing cost. The finger access recess 78 and the finger grip recess 80 allow a more comfortable experience in opening the door 62 when raising or lowering the folding ball 16. The hole in the truck bed 14 need only be the size of the tube formed hitch box 60, such that the hitch has a smaller areal profile in the truck bed 14 as compared to the plate 12 of the prior art.

Although the present invention has been described with reference to preferred embodiments, workers skilled in the art will recognize that changes may be made in form and detail without departing from the spirit and scope of the invention.

The invention claimed is:

1. A method of forming a folding hitch, comprising: cutting a tube to form a tube-formed box, the tube running longitudinally between ends in a horizontal arrangement, cutting an opening on its top side between, on one of the ends, a top wall as part of an original continuous circumference of the tube, and, on the opposing end, a top wall as part of an original continuous circumference of the tube; pivotally mounting a hitch ball on the tube-formed box for movement between an operative position and an inoperative, stowed position, the hitch ball extending through the opening and above the tube-formed box when the hitch ball is in the operative position, and the hitch ball retracting through the opening to reside within the tube-formed box when the hitch ball is in the inoperative, stowed position.

2. The method of claim 1, further comprising: securing the tube-formed box to an underbed frame, with the top side opening in the tube-formed box extending above an entirety of the underbed frame, and with upper longitudinally running corners of the tube of the tube formed box extending above the entirety of the underbed frame.

3. The method of claim 1, further comprising:
cutting an opening within the bed of a towing vehicle, the opening being sized to mate with the tube formed box; and
mounting the underbed frame of the folding hitch to a frame of the vehicle such that tube formed box extends through the bed of the towing vehicle with a portion of the bed of the towing vehicle being supported on the underbed frame of the folding hitch.

4. The method of claim 1, further comprising pivotally mounting a door on the tube formed box, the door covering at least a portion of the hitch ball when in the inoperative, stowed position, the cut opening having a width substantially equal to the interior width of the tube formed box, with the door having a width which mates into the width of the cut opening, such that folding hitch has the door in the stowed position running between upper longitudinally running corners of the tube.

5. A method of forming a folding hitch, comprising: cutting a tube to form a tube-formed box, cutting an opening on its top side; pivotally mounting a hitch ball on the tube-formed box for movement between an operative position and an inoperative, stowed position, the hitch ball extending above the tube-formed box when the hitch ball is in the operative position, and the hitch ball residing within the tube-formed box when the hitch ball is in the inoperative, stowed position; forming a finger hole through a door; forming a recess on the door, the recess connecting with the finger hole to allow more comfortable access to the finger hole; and pivotally mounting the door on the tube formed box, the door covering at least a portion of the hitch ball when in the inoperative, stowed position.

6. The method of claim 5, comprising forming a finger access recess in the top surface of the door and forming a finger grip recess in the bottom surface of the door.

7. The method of claim 6, wherein door is pivotally mounted on the tube formed box with a door pivot pin, wherein the finger access recess is formed on the pivot pin side of the finger hole, and wherein the finger grip recess is formed on the side of the finger hole away from the door pivot pin.

8. The method of claim 6, wherein the finger access recess and the finger grip recess each extend through at least half the thickness of the door.

9. The method of claim 6, further comprising forming a finger grip structure within the finger grip recess.

10. The method of claim 4, wherein the door is pivotally mounted to move between a closed position and an open position allowing movement of the hitch ball between the operative position and the inoperative position, the door in the closed position bearing against the hitch ball in the operative position for holding the hitch ball in the operative position, the door being mounted on a pivot pin, the method further comprising: cutting a door pivot pin opening in the tube which is contiguous with an end of the tube; and mounting the pivot pin of the door in the door pivot pin opening.

11. The method of claim 1, wherein the tube is a generally rectangular tube.

12. A folding hitch adapted to be mounted to a vehicle, the folding hitch comprising: an underbed frame securable to a vehicle beneath a bed of the vehicle; a horizontally disposed tube with open ends forming a tube formed box secured to the frame, the tube of the tube formed box running longitudinally between ends in a horizontal arrangement and having an opening on its top side higher than the underbed frame, the opening being between, on one of the ends, a top wall as part of an original continuous circumference of the tube, and, on the opposing end, a top wall as part of an original continuous circumference of the tube; and a hitch ball pivotally mounted on the tube formed box for movement between an operative position and an inoperative, stowed position, the hitch ball extending through the opening and above the tube formed box when the hitch ball is in the operative position, and the hitch ball retracting through the opening to reside within the tube formed box when the hitch ball is in the inoperative, stowed position.

13. The folding hitch of claim 12, further comprising a door pivotally mounted on the tube formed box, the door covering at least a portion of the ball when in the inoperative, stowed position, the opening having a width substantially equal to the interior width of the tube box, with the door having a width which mates into the width of the opening, such that folding hitch has the door in the stowed position running between upper longitudinally running corners of the tube.

14. A folding hitch adapted to be mounted to a vehicle, the folding hitch comprising: an underbed frame securable to a vehicle beneath a bed of the vehicle; a tube formed box secured to the frame, the tube formed box having an opening on its top side higher than the underbed frame; a hitch ball pivotally mounted on the tube formed box for movement between an operative position and an inoperative, stowed position, the hitch ball extending above the tube formed box when the hitch ball is in the operative position, and the hitch ball residing within the tube formed box when the hitch ball is in the inoperative, stowed position; a door pivotally mounted on the tube formed box, the door covering at least a portion of the ball when in the inoperative, stowed position; and a finger hole through the door, with a finger access recess in the top surface of the door connecting with the finger hole and a finger grip recess in the bottom surface of the door connecting with the finger hole.

15. The folding hitch of claim 14, wherein door is pivotally mounted on the tube formed box with a door pivot pin, wherein the finger access recess is on the pivot pin side of the finger hole, and wherein the finger grip recess is on the side of the finger hole away from the door pivot pin.

16. The folding hitch of claim 14, wherein the finger access recess and the finger grip recess each extend through at least half the thickness of the door.

17. The folding hitch of claim 14, further comprising a finger grip structure within the finger grip recess.

18. The folding hitch of claim 13, wherein the door moves between a closed position and an open position allowing movement of the ball between the operative position and the inoperative position, the door in the closed position bearing against the hitch ball in the operative position for holding the hitch ball in the operative position, the door being mounted on a pivot pin which resides in a door pivot pin opening in the tube, the door pivot pin opening being contiguous with an end of the tube.

19. The folding hitch of claim 12, wherein the tube is a generally rectangular tube.

20. A folding hitch adapted to be mounted to a vehicle, the folding hitch comprising:
    an underbed frame securable to a vehicle beneath a bed of the vehicle;
    a hitch box secured to the frame, the hitch box having an opening on its top side higher than the underbed frame; and
    a hitch ball pivotally mounted on the hitch box for movement between an operative position and an inoperative, stowed position, the hitch ball extending above the hitch box when the hitch ball is in the operative position, and the hitch ball residing within the hitch box when the hitch ball is in the inoperative, stowed position;
    a door pivotally mounted on the hitch box with a pivot pin, the door covering at least a portion of the ball when in the inoperative, stowed position, the door having a top surface and a bottom surface;
    a finger hole through the door;
    a finger access recess in the top surface of the door connecting with the finger hole on the pivot pin side of the finger hole; and
    a finger grip recess in the bottom surface of the door connecting with the finger hole on the side of the finger hole away from the door pivot pin.

* * * * *